US010213982B2

(12) United States Patent
Oshima et al.

(10) Patent No.: US 10,213,982 B2
(45) Date of Patent: Feb. 26, 2019

(54) DECORATIVE SHEET AND DECORATIVE PANEL (71) Applicant: TOPPAN PRINTING CO., LTD., Taito-ku, Tokyo (JP)

(72) Inventors: Nonoka Oshima, Tokyo (JP); Naoki Tokumoto, Tokyo (JP)

(73) Assignee: TOPPAN PRINTING CO., LTD., Taito-ku, Tokyo (JP)

( * ) Notice: Subject to any disclaimer, the term of this patent is extended or adjusted under 35 U.S.C. 154(b) by 0 days.

(21) Appl. No.: 15/744,305

(22) PCT Filed: Jul. 19, 2016

(86) PCT No.: PCT/JP2016/071179
§ 371 (c)(1),
(2) Date: Jan. 12, 2018

(87) PCT Pub. No.: WO2017/018276
PCT Pub. Date: Feb. 2, 2017

(65) Prior Publication Data
US 2018/0215122 A1    Aug. 2, 2018

(30) Foreign Application Priority Data

Jul. 24, 2015   (JP) .................................. 2015-146492
Jul. 24, 2015   (JP) .................................. 2015-146493
(Continued)

(51) Int. Cl.
B32B 3/30           (2006.01)
B32B 7/02           (2019.01)
(Continued)

(52) U.S. Cl.
CPC .................. B32B 3/30 (2013.01); B32B 7/02 (2013.01); B32B 27/00 (2013.01); B32B 27/08 (2013.01);
(Continued)

(58) Field of Classification Search
CPC ..... Y10T 428/24802; Y10T 428/24826; Y10T 428/24851; Y10T 428/31551
See application file for complete search history.

(56) References Cited

U.S. PATENT DOCUMENTS 4,856,857 A * 8/1989 Takeuchi ............. G03H 1/0244
                                                     1/244
6,210,776 B1 * 4/2001 Hill ........................ B41M 1/18
                                                     428/187
2010/0173132 A1 7/2010 Furukawa

FOREIGN PATENT DOCUMENTS

JP       S61-293854 A   12/1986
JP       H06-198830 A    7/1994
(Continued)

Primary Examiner — Betelhem Shewareged
(74) Attorney, Agent, or Firm — Squire Patton Boggs (US) LLP (57) ABSTRACT The present invention provides a decorative sheet (20A) that has at least one of visual solidity and solidity by a sense of touch. The decorative sheet (20A) includes a picture pattern layer (2) formed on a sheet base material (1), a first front surface protecting layer (3a) formed on the picture pattern layer (2), a second front surface protecting layer (4a) partially formed on the first front surface protecting layer (3a), and a third front surface protecting layer (5) partially formed on the second front surface protecting layer (4a). The first front surface protecting layer (3a) and the second front surface protecting layer (4a) have different glosses. The third front surface protecting layer (5) coats an area 75% or less of the second front surface protecting layer (4a). The third front surface protecting layer (5) has a thickness four
(Continued)

times or more of a thickness of the second front surface protecting layer (4a).

20 Claims, 7 Drawing Sheets

(30) Foreign Application Priority Data

Feb. 4, 2016 (JP) .................................. 2016-020102
Feb. 4, 2016 (JP) .................................. 2016-020103

(51) Int. Cl.
*B32B 27/00* (2006.01)
*B32B 27/08* (2006.01)
*B32B 27/20* (2006.01)
*B32B 27/30* (2006.01)
*B32B 27/40* (2006.01)

(52) U.S. Cl.
CPC ............ *B32B 27/20* (2013.01); *B32B 27/308* (2013.01); *B32B 27/40* (2013.01); *B32B 2264/101* (2013.01); *B32B 2307/406* (2013.01); *B32B 2451/00* (2013.01); *Y10T 428/24802* (2015.01); *Y10T 428/24826* (2015.01); *Y10T 428/24851* (2015.01); *Y10T 428/31551* (2015.04)

(56) References Cited

FOREIGN PATENT DOCUMENTS

| | | |
|---|---|---|
| JP | H07-237344 A | 9/1995 |
| JP | H09-248882 A | 9/1997 |
| JP | 2000-043223 A | 2/2000 |
| JP | 2014-188842 A | 10/2014 |
| JP | 2015-077709 A | 4/2015 |
| WO | WO 2008/129667 A1 | 10/2008 |

* cited by examiner

DECORATIVE SHEET AND DECORATIVE PANEL

TECHNICAL FIELD

The present invention relates to a decorative sheet and a decorative panel.

BACKGROUND ART

Conventionally, there has been provided technologies as a decorative sheet described in, for example, PTLs 1 and 2. The technology described in PTL 1 includes a first front surface protecting layer, which is formed on a picture pattern layer, and second front surface protecting layers, which are partially formed on the first front surface protecting layer. The second front surface protecting layer has a gloss different from the first front surface protecting layer. Thus, the gloss difference is provided on the surface of the decorative sheet such that a human visually feels solidity using an optical illusion of the human.

The technology described in PTL 2 contains inorganic particles or synthetic resin particles expressed by 10% to 20% on a front surface protecting layer, which is an outermost surface of a decorative sheet. Thus, a difference in height is provided on the surface of the decorative sheet such that solidity by a sense of touch is felt.

CITATION LIST

Patent Literature

PTL 1: JP 2000-43223 A
PTL 2: JP 2015-77709 A

SUMMARY OF INVENTION

Technical Problem

However, with a technology described in PTL 1, since unevenness on a surface of a decorative sheet is comparatively small, it is difficult to more preferably (appropriately) feel solidity by a sense of touch. Meanwhile, a technology described in PTL 2 fails to form a fine gloss expression; therefore, it is difficult to more preferably (appropriately) feel visual solidity.

The present invention focuses on the points as described above and the object is to provide a decorative sheet and a decorative panel that have at least one of visual solidity and solidity by a sense of touch.

Solution to Problem

To solve the problems, one aspect of the present invention includes a picture pattern layer, a first front surface protecting layer formed on the picture pattern layer, a second front surface protecting layer partially formed on the first front layer, and a third front surface protecting layer partially formed on the second front surface protecting layer. The first front surface protecting layer and the second front surface protecting layer have different glosses. The third front surface protecting layer coats a 75% or less area of the second front surface protecting layer. The third front surface protecting layer has a thickness four times or more of a thickness of the second front surface protecting layer.

Advantageous Effects of Invention

According to one aspect of the present invention, a first front surface protecting layer and second front surface protecting layers have a gloss difference; therefore, visual solidity can be felt. Furthermore, since third front surface protecting layers coat an area 75% or less of the second front surface protecting layers and the third front surface protecting layers have a thickness four times or more of a thickness of the second front surface protecting layers, the solidity can be felt by a sense of touch. Accordingly, a decorative sheet having the visual solidity and the solidity by the sense of touch can be provided.

DESCRIPTION OF EMBODIMENTS

Respective first to third embodiments of the present invention will now be described with reference to the drawings.

Here, the drawings are illustrated schematically; therefore, a relationship between a thickness and a planar dimension, a ratio of a thickness of each layer, and a similar specification are different from actual ones. Further, known structures are illustrated by rough sketch to simplify the drawings. Further, in the respective drawings, the identical reference numerals are assigned to elements having the identical or similar functions to omit a duplicate description. Further, the respective embodiments described below are exemplary configurations that embody the technological idea of the present invention, and do not limit the technological idea of the present invention to the materials, shapes, configurations, and a similar matter of components described below. Various modifications can be added to the technological idea of the present invention within the technological scope specified by claims described in CLAIMS.

[First Embodiment]

(Decorative Panel 10A)

Figure 1:
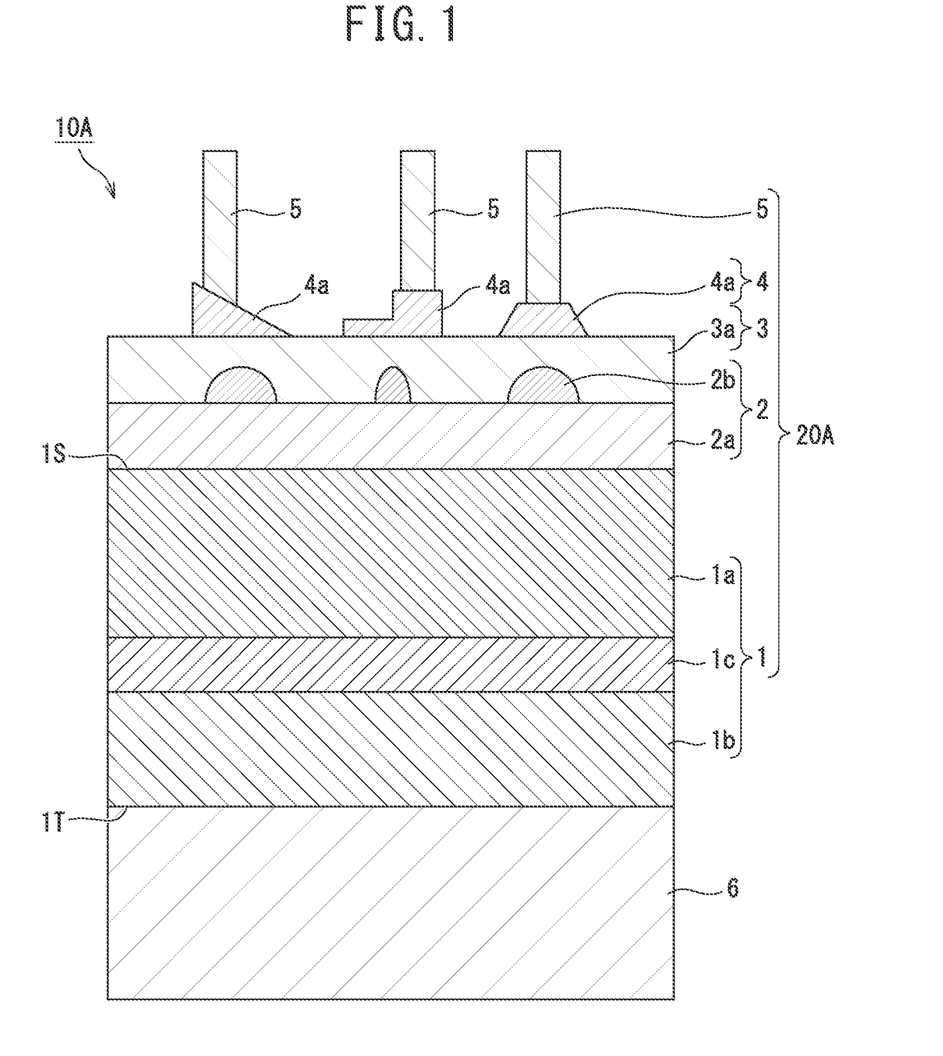
FIG. 1 is a cross-sectional view illustrative of a decorative panel according to a first embodiment of the present invention.

As illustrated in FIG. 1, the decorative panel 10A of this embodiment includes a picture pattern layer 2, a first front surface protecting layer 3 (3a), second front surface protecting layers 4 (4a), and third front surface protecting layers 5, which are laminated in this order on one surface (hereinafter also referred to as a "front surface 1S") side of a sheet base material 1 to form a decorative sheet 20A. A substrate 6 is pasted to the other surface (hereinafter also referred to as a "back surface 1T") side of the sheet base material 1. The decorative panel 10A of this embodiment is especially preferable for an interior decoration application such as a large-size sliding door.

(Sheet Base Material 1)

The sheet base material 1 is a sheet-shaped layer having a moisture-proof property. The moisture-proof property is a property of not causing water vapor to pass through. As the sheet base material 1, for example, a moisture-proof paper that includes two paper base materials 1a and 1b and a moisture-proof resin layer 1c, which is disposed between the two paper base materials 1a and 1b, is applicable. As the paper base materials 1a and 1b, for example, an inter-paper reinforcing paper containing a resin between cellulose fibers is applicable. For example, the inter-paper reinforcing paper preferably contains a cellulose fiber by 50 mass % or more. A thickness of the inter-paper reinforcing paper is, for example, 15 μm or more to less than 60 μm. A basis weight of the paper base material 1a on the front surface 1S side of the sheet base material 1 is, for example, designed to be 30 g/m$^2$, and a basis weight of the paper base material 1b on the back surface 1T side is, for example, designed to be 23 g/m$^2$.

The moisture-proof resin layer 1c is a layer constituted of a moisture-proof resin that does not cause water vapor to pass through. As the moisture-proof resin, for example, a thermoplastic resin such as an olefin-based resin with a melting point of 100° C. or more to less than 200° C. is preferable.

The moisture-proof resin layer 1c has the thickness of, for example, 20 μm or more to less than 70 μm.

Thus, the sheet base material 1 is produced as the moisture-proof paper, which does not cause water vapor to pass through. This ensures preventing water vapor from passing from the front surface side of the decorative sheet 20A through the back surface side, that is, from the third front surface protecting layer 5 side through the substrate 6 side, thereby ensuring preventing the substrate 6 from deforming due to water vapor (humidity). Therefore, for example, formation of a large-size sliding door with the decorative panel 10A allows preventing the deformation of the sliding door due to water vapor (humidity), thereby ensuring preventing a failure of opening and closing of the sliding door due to the deformation.

The moisture-proof paper includes the two paper base materials 1a and 1b and the moisture-proof resin layer 1c, which is disposed between the paper base materials 1a and 1b. This allows the sheet base material 1 to have a thickness and stiffness. Therefore, the decorative sheet 20A is less likely to generate creases and a curl of the decorative sheet 20A can be prevented. Accordingly, the decorative sheet 20A can be comparatively easily laminated to the substrate 6.

Figure 2:
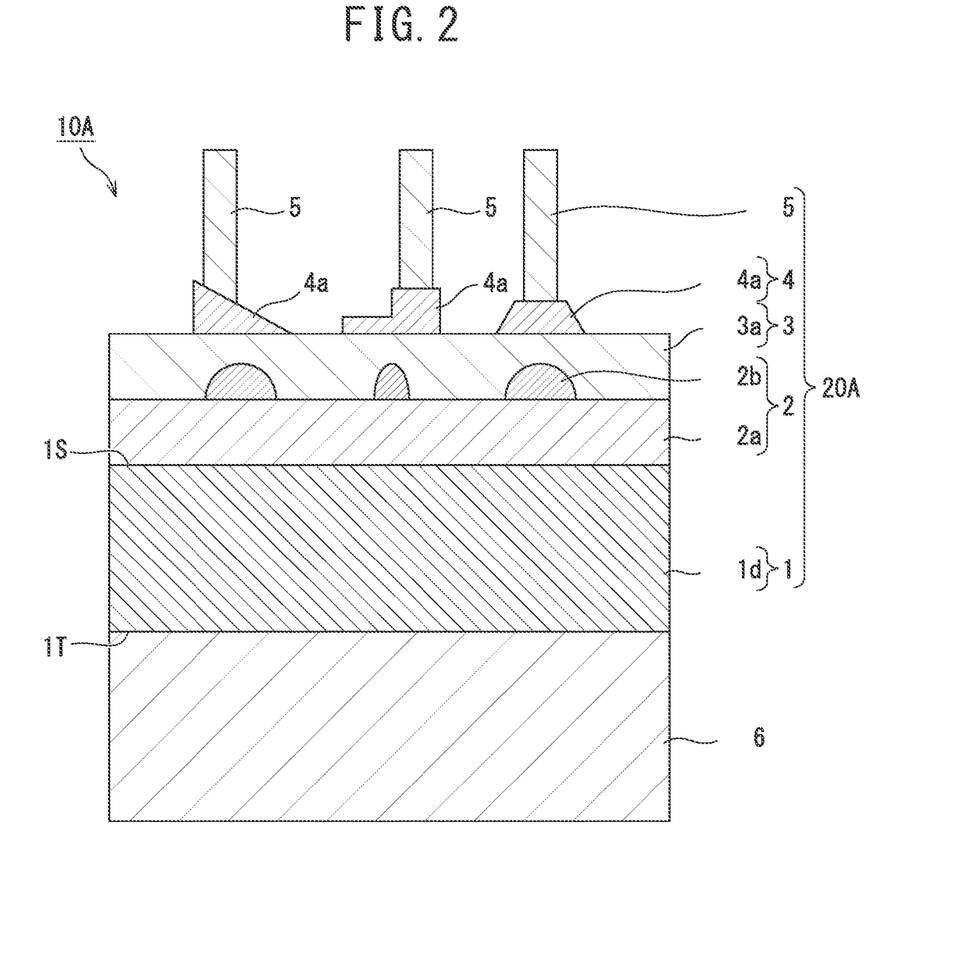
FIG. 2 is a cross-sectional view illustrative of a decorative panel according to a modification of the first embodiment of the present invention.

While this embodiment describes the example of using the moisture-proof paper as the sheet base material 1, other structures are also applicable. For example, as illustrated in FIG. 2, a structure using a paper base material 1d may be used. For example, a film made of a resin with a moisture-proof property such as a thermoplastic resin may be employed.

(Picture Pattern Layer 2)

The picture pattern layer 2 is a layer formed on the sheet base material 1 (the front surface 1S) by printing to add a picture to add design. As the picture, a picture appropriate for a site using the decorative sheet 20A, for example, a wood grain, a cork, a pebble, a tile, a pottery, and an abstract pattern are selectable. The picture pattern layer 2 is formed by laminating a pattern ink layer 2a, which covers the entire front surface 1S to serve as a base color of the picture, and a conduit ink layer 2b, which represents the picture other than the base color, on the front surface 1S of the sheet base material 1 in this order. As printing ink, for example, any of an isoindolinone yellow, a polyazo red, a phthalocyanine blue, a carbon black, an iron oxide, and a titanium oxide or a mixture of these substances are applicable as a pigment. For example, an ethyl acetate, an n-Butyl acetate, an isobutanol, and a methyl isobutyl ketone are applicable as a solvent.

(First Front Surface Protecting Layer 3a)

The first front surface protecting layer 3a is a sheet-shaped layer formed on the picture pattern layer 2 and coats the entire picture pattern layer 2. The first front surface protecting layer 3a is made of a transparent or semitransparent material (a resin) to the extent that the picture of the picture pattern layer 2 can be seen through the first front surface protecting layer 3a As a material of the first front surface protecting layer 3a, for example, a thermoset resin is preferable. As the thermoset resin, for example, taking adhesiveness between the second front surface protecting layer 4a and the third front surface protecting layer 5 and deformation followability and a scratch resistance of the decorative sheet 20A into consideration, the use of a mixture produced by adding silica particles (a luster adjuster, a matting agent) to the thermoset resin (a binder) containing urethane linkage such as a two-liquid curable urethane resin is preferable. In this case, as the solvent, the ethyl acetate and the n-Butyl acetate are applicable.

As the two-liquid curable urethane resin, for example, an urethane resin mainly constituted of a polyol and using the isocyanate as a crosslinking agent (a hardening agent) is applicable. The polyol having two or more hydroxyl groups in molecules, for example, a polyethylene glycol, a polypropylene glycol, an acrylic polyol, a polyester polyol, a polyether polyol, a polycarbonate polyol, and a polyurethane polyol are applicable.

As the isocyanate, a multivalent isocyanate having two or more isocyanate groups in the molecules is applicable. For example, an aromatic isocyanate such as a 2,4-tolylene diisocyanate, a xylene diisocyanate, and a 4,4'-diphenylmethane diisocyanate, or an aliphatic (or a cycloaliphatic) isocyanate such as a 1,6-hexamethylene diisocyanate, an isophorone diisocyanate, a hydrogenated tolylene diisocyanate, and a hydrogenated methylene diphenyl diisocyanate is applicable. An adduct or a multimer of the above-described various isocyanates is applicable. The adduct of a tolylene diisocyanate and a tolylene diisocyanate trimer are exemplified. In the above-described isocyanates, the aliphatic (or the cycloaliphatic) isocyanates are preferable in terms of excellent weather resistance and thermal yellowing resistance, for example, the 1,6-hexamethylene diisocyanate is applicable.

While this embodiment describes the example of using the silica particles as the matting agent (the luster adjuster), other structures are also applicable. For example, a structure that uses inorganic particles such as an alumina (such as α-alumina), a calcium carbonate, a barium sulfate, a kaolinite, and an aluminosilicate, or organic particles such as a polycarbonate, a nylon, and an urethane resin may be employed.

(Second Front Surface Protecting Layer 4a)

The second front surface protecting layers 4a are layers partially formed on the first front surface protecting layer 3a and coat a part of (for example, parts opposed to the printing inks of the pipe ink layers 2b) the first front surface protecting layer 3a. The second front surface protecting layer 4a is made of a transparent or a semitransparent material (a resin) to the extent that the picture of the picture pattern layer 2 can be seen through the second front surface protecting layer 4a and the first front surface protecting layer 3a. As the material of the second front surface protecting layer 4a, for example, a thermoset resin is preferable. For example, the thermoset resin containing the urethane linkage such as the two-liquid curable urethane resin is preferable as the thermoset resin.

In this case, as the solvent, the ethyl acetate and the n-Butyl acetate are applicable.

Thus, since the matting agent is not added, the second front surface protecting layer 4a can increase an amount of reflection of light compared with the first front surface protecting layer 3a to which the matting agent (the silica particles) is added, ensuring enriching the gloss (the shine). Therefore, the first front surface protecting layer 3a and the second front surface protecting layer 4a provide the front surface 1S of the decorative sheet 20A with the gloss difference, thereby allowing a human to feel visual solidity using an optical illusion of the human.

The second front surface protecting layers 4a may have a structure having a gradation in the gloss (the shine), that is, having high and low in the gloss (the shine). For example, the second front surface protecting layers 4a are thickened at sites where the gloss (the shine) is enriched and the first front surface protecting layer 3a is thinned at a site where the gloss (the shine) is lowered. The second front surface protecting layer 4a preferably has the thickness of, for example, 0.7 μm or more to less than 6.0 μm and more preferably 1 μm or more to less than 2 μm. This ensures providing the high and low of the gloss (the shine) to the respective portions of the second front surface protecting layers 4a. This provides the gloss difference at the respective portions of the second front surface protecting layers 4a, thereby allowing the human to further appropriately feel the visual solidity.

While this embodiment describes the example where the gloss (the shine) of the second front surface protecting layers 4a is enriched compared with the gloss (the shine) of the first front surface protecting layer 3a, this should not be construed in a limiting sense. It is only necessary that the second front surface protecting layers 4a and the first front surface protecting layer 3a have the gloss (the shine) different from one another. For example, the addition of the matting agent to the first front surface protecting layer 3a may be omitted, and the matting agent may be added to the second front surface protecting layers 4a to enrich the gloss (the shine) of the first front surface protecting layer 3a compared with the gloss of the second front surface protecting layers 4a. Accordingly, a fingerprint (a dirt from a hand) dirt is less likely to attach, thereby ensuring improving a contamination resistance of the decorative sheet 20A. The improvement effect of the contamination resistance can be obtained even a low amount of application to the first front surface protecting layer 3a. The picture expression (for example, the wood grain expression) in a paint style can be performed. Furthermore, since cloudiness of the first front surface protecting layer 3a is reduced, the design expression of the picture with further fineness and transparency is possible.

(Third Front Surface Protecting Layers 5)

The third front surface protecting layers 5 are layers partially formed on the second front surface protecting layers 4a to coat apart of the second front surface protecting layers 4a. For example, the third front surface protecting layers 5 are formed on an area 1% or more to 75% or less of the second front surface protecting layers 4a. The third front surface protecting layer 5 is made of a transparent or a semitransparent material (a resin) to the extent that the picture of the picture pattern layer 2 can be seen through the third front surface protecting layer 5 or a similar layer. As the material of the third front surface protecting layer 5, for example, a thermoset resin is preferable. As the thermoset resin, for example, a mixture of adding synthetic resin beads with an average grain diameter of 30 μm or more to the thermoset resin (the binder) containing the urethane linkage such as the two-liquid curable urethane resin is preferably used. As the synthetic resin beads, for example, acrylic resin beads with high transparency is applicable. This ensures improving the transparency of the third front surface protecting layer 5 and ensures further clearly seeing the picture of the picture pattern layer 2 to add the design through the third front surface protecting layer 5.

Figure 3:
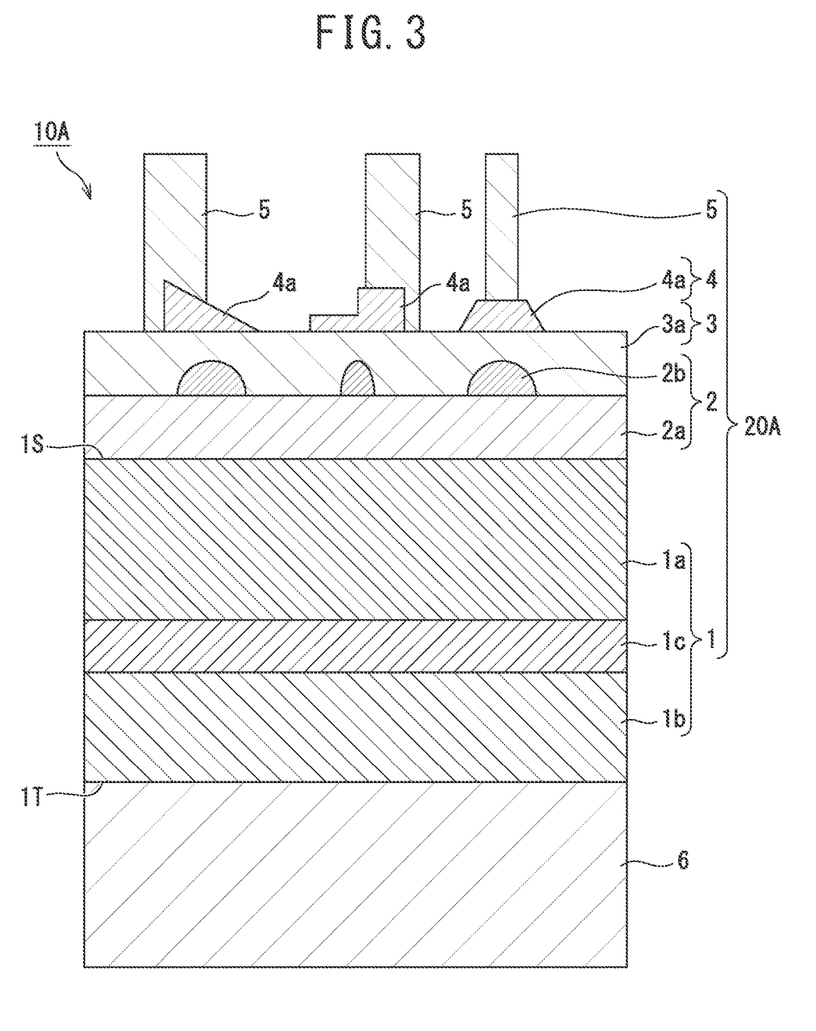
FIG. 3 is a cross-sectional view illustrative of a decorative panel according to a modification of the first embodiment of the present invention.

In the example illustrated in FIG. 1, while the third front surface protecting layers 5 are formed only on the second front surface protecting layers 4a, for example, as illustrated in FIG. 3, the third front surface protecting layers 5 may protrude from the second front surface protecting layers 4a and a part of which maybe formed on the first front surface protecting layer 3a. In this case, the third front surface protecting layers 5 are formed on the area 90% or less of the first front surface protecting layer 3a not coated by the second front surface protecting layers 4a in the first front surface protecting layer 3a.

The third front surface protecting layer 5 preferably has the thickness four times or more of the thickness of the second front surface protecting layer 4a and is more preferably 10 times or more. For example, with the thickness of the second front surface protecting layer 4a of 0.7 μm or more to less than 6.0 μm, the thickness of the third front surface protecting layer 5 is configured to be 30 μm or more to less than 120 μm. As the thickness of the third front surface protecting layer 5, for example, a maximum height Rmax value found through measurement of the surface of the third front surface protecting layer 5 by a contact type roughness meter is applicable. That is, the surface of the third front surface protecting layer 5 has the maximum height Rmax value measured by the contact type roughness meter of 30 μm or more.

Thus, since the third front surface protecting layers 5 coat the area 75% or less of the second front surface protecting layers 4a and have the thickness four times or more of the second front surface protecting layers 4a, the difference in height can be provided between the second front surface protecting layers 4a and the third front surface protecting layers 5. Therefore, the solidity by the sense of touch can be felt. Then, the third front surface protecting layers 5 do not cover the area larger than 75% of the second front surface protecting layers 4a; therefore, the fine gloss/mat design is not cancelled due to the gloss difference between the first front surface protecting layer 3a and the second front surface protecting layers 4a.

Since the maximum height Rmax value of the surface of the third front surface protecting layer 5 measured by the contact type roughness meter is configured to be 30 μm or more, the solidity by the sense of touch can be further appropriately felt.

While this embodiment describes the example of using the thermoset resin as the binder, other structures are also applicable. For example, a structure using an ionizing radiation cured resin may be used. As the ionizing radiation cured resin, for example, an ultraviolet ray-curable resin is preferable. As the ultraviolet ray-curable resin, for example, a (meta) acrylic-based resin, a silicone-based resin, a polyester-based resin, an urethane-based resin, an amide-based resin, and an epoxide-based resin are applicable. This ensures improving hardness of the third front surface protecting layers 5, namely, the outermost surface layers of the decorative sheet 20A, thereby ensuring improving surface physical properties such as a wear resistance, the scratch resistance, and a solvent resistance of the decorative sheet 20A. For example, as the binder, a structure using a mixture of the thermoset resin and the ionizing radiation cured resin may be used.

While this embodiment describes the example of adding the synthetic resin beads to the thermoset resin, other structures may be employed. For example, a structure of adding a filler of an inorganic compound may be used.

The shape of the third front surface protecting layers 5 is not especially limited and may be a fixed shape regularly arranged such as a circle, a quadrangle, and a hexagon or may be an irregular picture shape. The shape may be harmonized with the picture of the picture pattern layer 2 to ensure presenting the picture with more reality.

(Substrate 6)

The substrate 6 is a metallic or woody plate-shaped member. As the metallic substrate 6, for example, an aluminum, a steel, a stainless steel, and a composite panel are applicable. There has been provided a composite panel including, for example, a resin layer becoming a core material and metal plates (such as an aluminum, a garubariumu, and a stainless steel) pasted to respective both surfaces of the resin layer. As the woody substrate 6, a medium density fiberboard (MDF), a plywood, and a chip board are applicable.

Thus, since this embodiment includes the transparent or semitransparent first front surface protecting layer 3a, second front surface protecting layers 4a, and the third front surface protecting layers 5 on the picture pattern layer 2, the picture of the picture pattern layer 2 can be seen through the first front surface protecting layer 3a, the second front surface protecting layers 4a, and the third front surface protecting layers 5.

With this embodiment, the first front surface protecting layer 3a and the second front surface protecting layers 4a have the gloss difference; therefore, the visual solidity can be felt.

Furthermore, since the third front surface protecting layers 5 coat the area 75% or less of the second front surface protecting layers 4a and the third front surface protecting layer 5 has the thickness four times or more of the thickness of the second front surface protecting layer 4a, the solidity can be felt by the sense of touch.

In addition to the above-described effects, since this embodiment uses the moisture-proof paper as the sheet base material 1, this avoids water vapor to pass from the front surface side of the decorative sheet 20A through the back surface side, that is, from the third front surface protecting layer 5 side through the substrate 6 side. This ensures preventing the deformation of the substrate 6 due to water vapor (humidity). Therefore, for example, the formation of the large-size sliding door with the decorative panel 10A can prevent the deformation of the sliding door due to water vapor (humidity), and the failure of the opening and closing of the sliding door due to the deformation can be prevented.

(Effects of This Embodiment)

The present invention according to the embodiment provides the following effects.

(1) The decorative sheet 20A according to the embodiment includes the picture pattern layer 2 formed on the sheet base material 1, the first front surface protecting layer 3a formed on the picture pattern layer 2, the second front surface protecting layers 4a partially formed on the first front surface protecting layer 3a, and the third front surface protecting layers 5 partially formed on the second front surface protecting layers 4a. The first front surface protecting layer 3a and the second front surface protecting layers 4a have different glosses. The third front surface protecting layers 5 coat an area 75% or less of the second front surface protecting layers 4a. The third front surface protecting layers 5 have a thickness four times or more of a thickness of the second front surface protecting layers 4a.

With this structure, the first front surface protecting layer 3a and the second front surface protecting layers 4a have a gloss difference; therefore, the visual solidity can be felt. Furthermore, since the third front surface protecting layers 5 coat the area 75% or less of the second front surface protecting layers 4a and the third front surface protecting layers 5 have the thickness four times or more of the thickness of the second front surface protecting layers 4a, the solidity can be felt by the sense of touch. Accordingly, the decorative sheet 20A having the visual solidity and the solidity by the sense of touch can be provided.

(2) With the decorative sheet 20A according to the embodiment, the third front surface protecting layer 5 has the surface with the maximum height Rmax value measured by the contact type roughness meter of 30 μm or more.

With this structure, the solidity by the sense of touch can be further appropriately felt.

(3) With the decorative sheet 20A according to the embodiment, the first front surface protecting layer 3a contains the thermoset resin containing the urethane linkage and the silica particles.

With this structure, adhesiveness with other layers such as the picture pattern layer 2 and the second front surface protecting layers 4a and the deformation followability and a damage resistance of the decorative sheet 20A can be improved.

(4) With the decorative sheet 20A according to the embodiment, the second front surface protecting layer 4a contains the thermoset resin containing the urethane linkage.

With this structure, the adhesiveness to the adjacent layers such as the first front surface protecting layer 3a and the third front surface protecting layer 5 and the deformation followability and the damage resistance of the decorative sheet 20A can be improved.

(5) With the decorative sheet 20A according to the embodiment, the third front surface protecting layer 5 contains the thermoset resin containing the urethane linkage.

With this structure, the adhesiveness to the adjacent layers such as the first front surface protecting layer 3a and the second front surface protecting layer 4a and the deformation followability and the damage resistance of the decorative sheet 20A can be improved.

(6) With the decorative panel 10A according to the embodiment, the third front surface protecting layer 5 contains the ionizing radiation cured resin.

This structure allows improving the hardness of the outermost surface layer of the decorative sheet 20A and can improve the wear resistance of the decorative sheet 20A and the surface physical properties such as the scratch resistance and the solvent resistance.

(7) With the decorative panel 10A according to the embodiment, the third front surface protecting layer 5 contains the synthetic resin beads with the average grain diameter of 30 μm or more or the filler of the inorganic compound.

With this structure, the hardness of the third front surface protecting layer 5 can be improved and the wear resistance and the damage resistance of the decorative sheet 20A can be improved.

(8) With the decorative sheet 20A according to the embodiment, the sheet base material 1 has the moisture-proof property.

This structure ensures preventing water vapor from passing from the front surface side of the decorative sheet 20A through the back surface side, that is, from the third front surface protecting layer 5 side through the substrate 6 side, thereby ensuring preventing the substrate 6 from deforming due to water vapor (humidity). Therefore, for example, the formation of the large-size sliding door with the decorative panel 10A allows preventing the deformation of the sliding door due to water vapor (humidity), thereby ensuring preventing the failure of the opening and closing of the sliding door due to the deformation.

(9) With the decorative sheet 20A according to the embodiment, the sheet base material 1 includes the two paper base materials 1a and 1b and the moisture-proof resin layer 1c, which is disposed between the two paper base materials 1a and 1b.

This structure allows the sheet base material 1 to have the thickness and the stiffness. Therefore, the decorative sheet 20A is less likely to generate creases and a curl of the decorative sheet 20A can be prevented. Accordingly, the decorative sheet 20A can be comparatively easily laminated to the substrate 6.

(10) With the decorative sheet 20A according to the embodiment, the synthetic resin beads are the acrylic resin beads.

This structure ensures improving the transparency of the third front surface protecting layer 5 and ensures further clearly seeing the picture of the picture pattern layer 2 to add the design through the third front surface protecting layer 5.

(11) The decorative panel 10A according to the embodiment is formed by pasting the decorative sheet 20A to the substrate 6.

This structure allows providing the decorative panel 10A having the visual solidity and the solidity by the sense of touch.

(Modifications)

Figure 4:
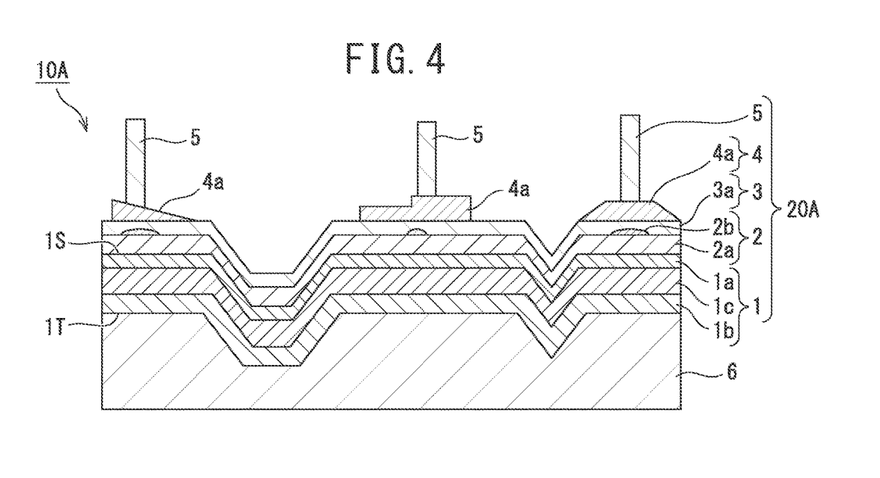
FIG. 4 is a cross-sectional view illustrative of a decorative panel according to a modification of the first embodiment of the present invention.
Figure 5:
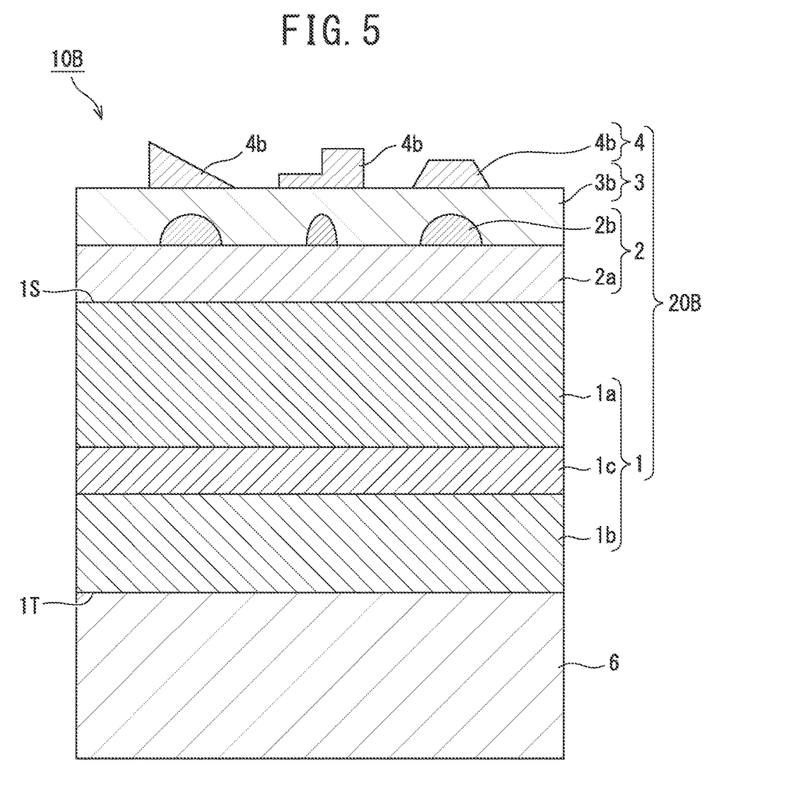
FIG. 5 is a cross-sectional view illustrative of a decorative panel according to a second embodiment of the present invention.

While the embodiment describes the example where the visual solidity and the solidity by the sense of touch are felt by the gloss difference between the first front surface protecting layer 3a and the second front surface protecting layers 4a and the difference in height between the second front surface protecting layers 4a and the third front surface protecting layers 5, other structures are also applicable. For example, as illustrated in FIG. 4, concavo-convex shapes may be formed on the decorative sheet 20A by an embossing process and the concavo-convex shape may cause the human to further feel the solidity by the sense of touch. In this case, the embossing process may cause a depressed portion with a depth of 15 μm or more to pass through between an embossing roll and a rubber back roll with hardness of 50 degrees or more to less than 90 degrees to form the concavo-convex shape on the decorative sheet 20A. As a measurement method for the hardness, for example, JIS K 6301 A is applicable. The substrate 6 is pasted to the decorative sheet 20A with the concavo-convex shape to form the decorative panel 10A.

[Second Embodiment]
(Decorative Panel 10B)

As illustrated in FIG. 4, the decorative panel 10B of this embodiment includes the picture pattern layer 2, a first front surface protecting layers 3 (3b), and a second front surface protecting layers 4 (4b), which are laminated in this order on the one surface (the front surface 1S) side of the sheet base material 1 to form a decorative sheet 20B. The substrate 6 is pasted to the other surface (the back surface 1T) side of the sheet base material 1. The decorative panel 10B of this embodiment is especially preferable for the interior decoration application such as the large-size sliding door.

The sheet base material 1, the picture pattern layer 2, and the substrate 6 included in the decorative panel 10B of this embodiment are identical to the sheet base material 1, the picture pattern layer 2, and the substrate 6 included in the decorative panel 10A according to the first embodiment. However, the first front surface protecting layer 3b and the second front surface protecting layer 4b included in the decorative panel 10B are different from the first front surface protecting layer 3a and the second front surface protecting layer 4a included in the decorative panel 10A.

Therefore, here, the detailed description of the sheet base material 1, the picture pattern layer 2, and the substrate 6, which are the identical parts to those of the decorative panel 10A, is omitted, and the first front surface protecting layer 3b and the second front surface protecting layer 4b, which are the parts different from those of the decorative panel 10A, are described in detail.

(First Front Surface Protecting Layer 3b)

The first front surface protecting layer 3b differs from the first front surface protecting layer 3a according to the first embodiment in that the matting agent such as the silica particles is not added to the thermoset resin as the material.

Thus, since the matting agent is not added, the first front surface protecting layer 3b can increase the amount of reflection of the light compared with the second front surface protecting layer 4b to which the matting agent (the silica particles), which will be described later, is added, ensuring enriching the gloss (the shine). Therefore, the first front surface protecting layer 3b and the second front surface protecting layer 4b provide the front surface of the decorative sheet 20B with the gloss difference, thereby allowing the human to feel visual solidity using the optical illusion of the human.

Since the first front surface protecting layer 3b contains the thermoset resin containing the urethane linkage, that is, the resin with high hardness, the first front surface protecting layer 3b, which is exposed to the front surface, ensures improving the damage resistance of the decorative sheet 20B. Furthermore, since the gloss (the shine) of the first front surface protecting layer 3b is enriched compared with the gloss (the shine) of the second front surface protecting layer 4b, smoothness on the surface of the first front surface protecting layer 3b can be enhanced and the fingerprint (the dirt from the hand) dirt is less likely to attach, thereby ensuring improving the contamination resistance of the decorative sheet 20B. The improvement effect of the contamination resistance can be obtained even the low amount of application to the first front surface protecting layer 3b. Additionally, the picture expression (for example, the wood grain expression) in the paint style, which is popular in the United States of America and a similar country, can be performed. Since the cloudiness of the first front surface protecting layer 3b is reduced, the design expression of the picture with further fineness and transparency is possible.

Since other materials and the like constituting the first front surface protecting layer 3b is similar to the first front surface protecting layer 3a, the detailed description is omitted here.

(Second Front Surface Protecting Layer 4b)

The second front surface protecting layers 4b are layers partially formed on the first front surface protecting layer 3b and coat a part of (for example, parts opposed to the printing inks of the pipe ink layers 2b) the first front surface protecting layer 3b. Accordingly, the wood grain pipe can be visually expressed. It is only necessary to form the second front surface protecting layers 4b on the area, for example, 0.1% or more of the first front surface protecting layer 3b. Since this embodiment configures the first front surface protecting layer 3b with the high damage resistance and contamination resistance, even when the area of the second front surface protecting layers 4b is small, the decorative sheet 20B can be configured excellent in the damage resistance and the contamination resistance.

The second front surface protecting layer 4b is made of a transparent or semitransparent material (a resin) to the extent that the picture of the picture pattern layer 2 can be seen through the second front surface protecting layer 4b and the first front surface protecting layer 3b. As the material of the second front surface protecting layer 4b, for example, the thermoset resin is applicable similar to the first front surface protecting layer 3b. As the thermoset resin, for example, taking the adhesiveness with the first front surface protecting layer 3b and the deformation followability, the scratch resistance, and a similar specification of the decorative sheet 20B into consideration, the thermoset resin containing the urethane linkage such as the two-liquid curable urethane resin is preferable. Here, the matting agent such as the silica particles is added to the thermoset resin. This enriches the gloss of the first front surface protecting layer 3b compared with the gloss of the second front surface protecting layers 4b. As the solvent, the ethyl acetate and the n-Butyl acetate are applicable. The upper limit of the area of the second front surface protecting layers 4b is set to be 30% or less of the first front surface protecting layer 3b.

The shape of the second front surface protecting layers 4b is not especially limited and may be a fixed shape regularly arranged such as a circle, a quadrangle, and a hexagon or may be an irregular picture shape. The shape may be harmonized with the picture of the picture pattern layer 2 to ensure presenting the picture real.

The second front surface protecting layers 4b may have a structure having a gradation in the gloss (the shine), that is, having high and low in the gloss (the shine). For example, the second front surface protecting layers 4b are thickened at sites where the gloss (the shine) is enriched and the first front surface protecting layer 3b is thinned at a site where the gloss (the shine) is lowered. This ensures providing the high and low of the gloss (the shine) to the respective portions of the second front surface protecting layers 4b. This provides the gloss difference at the respective portions of the second front surface protecting layers 4b, thereby allowing the human to further appropriately feel the visual solidity.

The second front surface protecting layer 4b is thus made of the thermoset resin containing the urethane linkage, that is, the resin insusceptible to the gloss of the lower layer (the first front surface protecting layer 3b); therefore, the visual solidity can be appropriately expressed by the first front surface protecting layer 3b and the second front surface protecting layers 4b. Additionally, the thermoset resin containing the urethane linkage features the high hardness, ensuring improving the damage resistance of the decorative sheet 20B.

While this embodiment describes the example of using the thermoset resin as the binder, other structures are also applicable. For example, a structure using an ionizing radiation cured resin may be used. As the ionizing radiation cured resin, for example, an ultraviolet ray-curable resin is preferable. As the ultraviolet ray-curable resin, for example, a (meta) acrylic-based resin, a silicone-based resin, a polyester-based resin, an urethane-based resin, an amide-based resin, and an epoxide-based resin are applicable. This ensures improving the hardness of the second front surface protecting layers 4b, namely, the outermost surface layers of the decorative sheet 20B, thereby ensuring improving the surface physical properties such as the wear resistance, the scratch resistance, and the solvent resistance of the decorative sheet 20B.

For example, as the binder, a structure using a mixture of the thermoset resin and the ionizing radiation cured resin may be used.

While this embodiment describes the example of using the silica particles as the matting agent (the luster adjuster), other structures are also applicable. For example, a structure that uses inorganic particles such as an alumina (such as α-alumina), a calcium carbonate, a barium sulfate, a kaolinite, and an aluminosilicate, or organic particles such as a polycarbonate, a nylon, and an urethane resin may be employed.

Since this embodiment thus includes the transparent or semitransparent first front surface protecting layer 3b and second front surface protecting layers 4b on the picture pattern layer 2, the picture of the picture pattern layer 2 can be seen through.

This embodiment enriches the gloss of the first front surface protecting layer 3b compared with the gloss of the second front surface protecting layers 4b; therefore, a convex portion can be expressed by the first front surface protecting layer 3b and depressed portions can be expressed by the second front surface protecting layers 4b. Accordingly, with the decorative sheet 20B, the visual solidity can be felt.

Furthermore, since this embodiment uses the moisture-proof paper as the sheet base material 1, this ensures causing water vapor to be less likely to pass from the front surface side of the decorative sheet 20B through the back surface side, that is, from the second front surface protecting layer 4b side through the substrate 6 side, thereby ensuring preventing the substrate 6 from deforming due to water vapor (humidity). Therefore, for example, the formation of the large-size sliding door with the decorative panel 10B allows preventing the deformation of the sliding door due to water vapor (humidity), thereby ensuring preventing the failure of the opening and closing of the sliding door due to the deformation.

(Effects of This Embodiment)

The present invention according to the embodiment provides the following effects.

(1) The decorative sheet 20B according to the embodiment includes the picture pattern layer 2 formed on the sheet base material 1, the first front surface protecting layer 3b formed on the picture pattern layer 2, and the second front surface protecting layers 4b partially formed on the first front surface protecting layer 3b. The first front surface protecting layer 3b contains the thermoset resin containing the urethane linkage. The second front surface protecting layer 4b contains the thermoset resin containing the urethane linkage or the ionizing radiation cured resin. The second front surface protecting layers 4b coat the area 0.1% or more to 30% or less of the first front surface protecting layer 3b. Additionally, the gloss of the first front surface protecting layer 3b is enriched compared with the gloss of the second front surface protecting layer 4b.

Thus, the first front surface protecting layer 3b is made of the resin with the high hardness and the gloss of the first front surface protecting layer 3b is enriched. Furthermore, the first front surface protecting layer 3b is made of the resin by which the second front surface protecting layers 4b can express the visual solidity insusceptible to the gloss of the first front surface protecting layer 3b even when the second front surface protecting layers 4b are formed on the first front surface protecting layer 3b. This ensures providing the decorative sheet 20B excellent in the damage resistance and the contamination resistance and maintaining the visual solidity with the first front surface protecting layer 3b exposed to the front surface.

(2) With the decorative sheet 20B according to the embodiment, the gloss of the second front surface protecting layers 4b has the gradation.

This structure ensures providing the high and low of the gloss (the shine) to the respective portions of the second front surface protecting layers 4b. This provides the gloss difference at the respective portions of the second front surface protecting layers 4b, thereby allowing the human to further appropriately feel the visual solidity.

(3) With the decorative sheet 20B according to the embodiment, the sheet base material 1 includes the two paper base materials 1a and 1b and the moisture-proof resin layer 1c, which is disposed between the two paper base materials 1a and 1b.

This structure allows the sheet base material 1 to have the thickness and the stiffness. Therefore, the decorative sheet 20B is less likely to generate creases and a curl of the decorative sheet 20B can be prevented. Accordingly, the decorative sheet 20B can be comparatively easily laminated to the substrate 6.

(4) With the decorative sheet 20B according to the embodiment, the first front surface protecting layer 3b contains the thermoset resin containing the urethane linkage and the silica particles.

With this structure, the adhesiveness with other layers such as the picture pattern layer 2 and the second front surface protecting layers 4b and the deformation followability and the damage resistance of the decorative sheet 20B can be improved.

(5) The decorative panel 10B according to the embodiment is formed by pasting the decorative sheet 20B to the substrate 6.

This structure ensures providing the decorative panel 10B excellent in the damage resistance and the contamination resistance while maintaining the visual solidity.

(Modifications)

Figure 6:
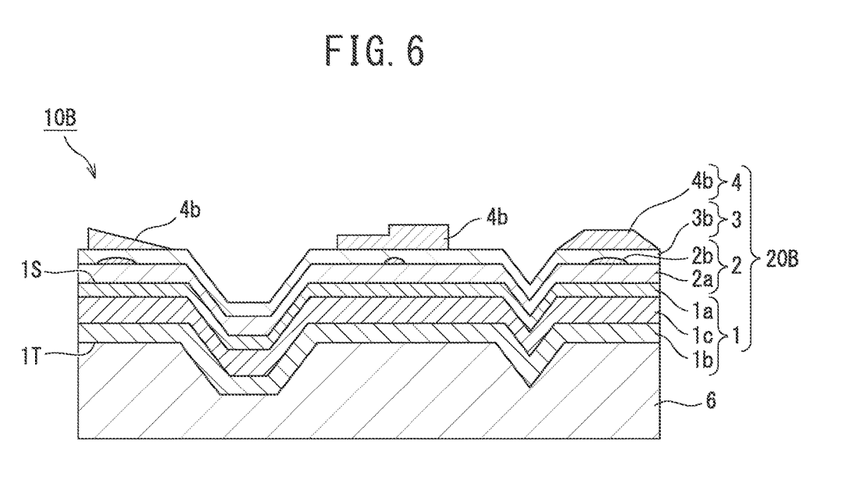
FIG. 6 is a cross-sectional view illustrative of a decorative panel according to a modification of the second embodiment of the present invention.

While the embodiment describes the example where the visual solidity is felt by the gloss difference between the first front surface protecting layer 3b and the second front surface protecting layers 4b, other structures are also applicable. For example, as illustrated in FIG. 6, the embossing may be formed on the decorative sheet 20B by the embossing process and the solidity by the sense of touch is further felt through the embossing. In this case, the embossing process may cause a depressed portion with a depth of 15 μm or more to pass through between an embossing roll and a rubber back roll with hardness of 50 degrees or more to less than 90 degrees to form the concavo-convex shape on the decorative sheet 20B. As a measurement method for the hardness, for example, JIS K 6301 A is applicable. The substrate 6 is pasted to the embossed decorative sheet 20B to form the decorative panel 10B.

(Reference Examples)

The following briefly describes a decorative sheet and a decorative panel that do not include the above-described technological features as the reference examples of the decorative sheet and the decorative panel according to this embodiment.

Conventionally, there has been provided technologies as a decorative sheet described in, for example, the above-described PTLs 1 and 2. The technology described in PTL 1 includes a first front surface protecting layer, which is formed on a picture pattern layer, and second front surface protecting layers, which are partially formed on the first front surface protecting layer. The second front surface protecting layer has a gloss different from the first front surface protecting layer. Thus, the gloss difference is provided on the surface of the decorative sheet such that a human visually feels solidity using an optical illusion of the human.

The technology described in PTL 2 contains inorganic particles or synthetic resin particles expressed by 10% to 20% on a front surface protecting layer, which is an outermost surface of a decorative sheet. Thus, a difference in height is provided on the surface of the decorative sheet such that solidity by a sense of touch is felt.

However, with the decorative sheet manufactured by the technology described in PTL 1, since the unevenness on the surface of the decorative sheet is comparatively small, it is difficult to feel the solidity by the sense of touch. Meanwhile, the decorative sheet manufactured by the technology described in PTL 2 fails to form a fine gloss expression; therefore, it is difficult to feel the visual solidity.

[Third Embodiment]

(Decorative Panel 10C)

Figure 7:
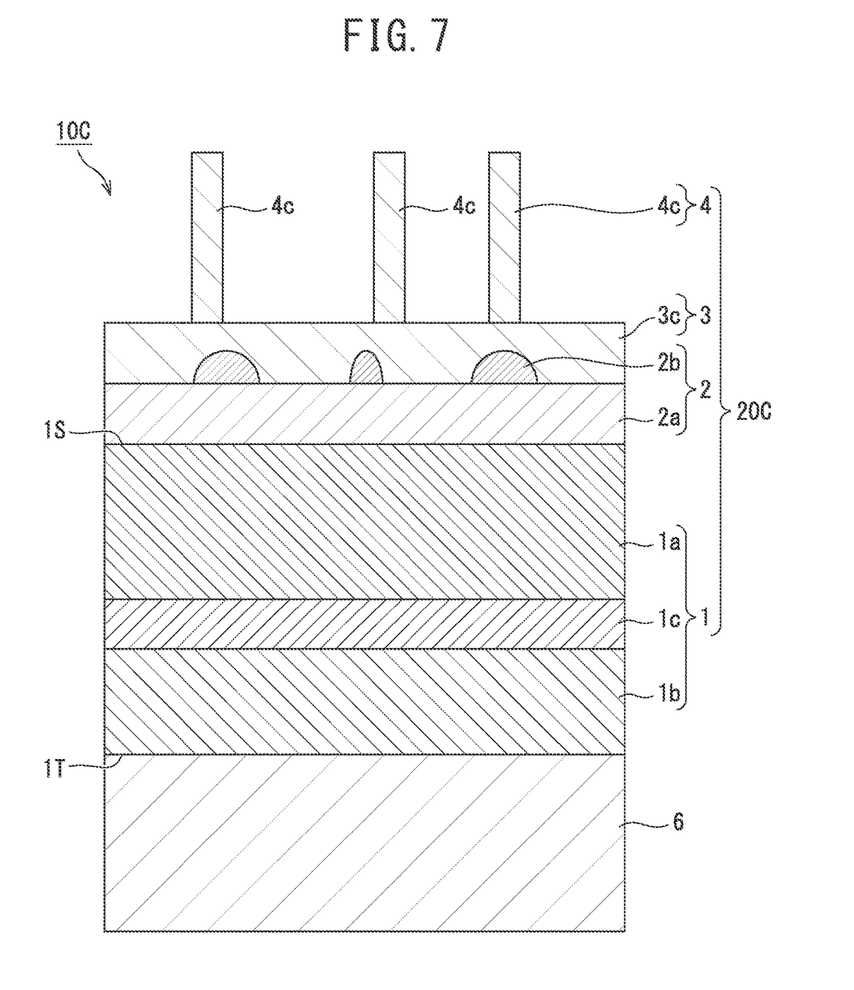
FIG. 7 is a cross-sectional view illustrative of a decorative panel according to a third embodiment of the present invention.

As illustrated in FIG. 7, the decorative panel 10C of this embodiment includes the picture pattern layer 2, a first front surface protecting layer 3c, and second front surface protecting layers 4c, which are laminated in this order on the one surface (the front surface 1S) side of the sheet base material 1 to form a decorative sheet 20C. The substrate 6 is pasted to the other surface (the back surface 1T) side of the sheet base material 1. The decorative panel 10C of this embodiment is especially preferable for the interior decoration application such as the large-size sliding door.

The sheet base material 1, the picture pattern layer 2, and the substrate 6 included in the decorative panel 10C of this embodiment are identical to the sheet base material 1, the picture pattern layer 2, and the substrate 6 included in the decorative panel 10A according to the first embodiment. The first front surface protecting layer 3c included in the decorative panel 10C is identical to the first front surface protecting layer 3b included in the decorative panel 10B according to the second embodiment. However, the second front surface protecting layer 4c included in the decorative panel 10C is different from the respective second front surface protecting layer 4a included in the decorative panel 10A and second front surface protecting layer 4b included in the decorative panel 10B.

Therefore, here, the detailed description of the sheet base material 1, the picture pattern layer 2, the first front surface protecting layer 3c, and the substrate 6, which are the identical parts to those of the decorative panel 10A and the decorative panel 10B, is omitted, and the second front surface protecting layer 4c, which is the part different from those of the decorative panel 10A and the decorative panel 10B, is described in detail.

(Second Front Surface Protecting Layer 4c)

For example, the thermoset resin is preferable as the material of the second front surface protecting layer 4c. As the thermoset resin, for example, taking the adhesiveness with the first front surface protecting layer 3c and a similar specification into consideration, the use of the mixture produced by adding the matting agent such as the silica particles and the synthetic resin beads to the thermoset resin (the binder) containing the urethane linkage such as the two-liquid curable urethane resin is preferable.

Here, the silica particles are preferably contained by 5 mass % or more to the total mass of the thermoset resin. This ensures sufficiently reducing the gloss of the second front surface protecting layer 4c and ensures increasing the gloss difference between the second front surface protecting layer 4c and the first front surface protecting layer 3c. Therefore, even when the area of the second front surface protecting layers 4c is smaller than the total area of the first front surface protecting layer 3c, the visual solidity can be appropriately felt. The upper limit of the silica particles is set to be 35 mass % or less to the total mass of the thermoset resin.

As the synthetic resin beads, for example, acrylic resin beads with high transparency is applicable. Accordingly, the transparency of the second front surface protecting layer 4c can be improved and the picture of the picture pattern layer 2 to add the design can be further clearly seen through. The average grain diameter of the synthetic resin beads is designed to be 30 μm or more. As the solvent, the ethyl acetate and the n-Butyl acetate are applicable.

The maximum height Rmax value of the surface of the second front surface protecting layer 4c measured by the contact type roughness meter is configured to be 30 μm or more. This allows the human to more appropriately feel the solidity by the sense of touch.

While this embodiment describes the example of adding the synthetic resin beads to thermoset resin, other structures may be applicable. For example, a structure to which the filler of the inorganic compound is added may be applicable.

Since other materials and the like constituting the second front surface protecting layer 4c is similar to the second front surface protecting layer 4b, the detailed description is omitted here.

Since this embodiment thus includes the transparent or semitransparent first front surface protecting layer 3c and second front surface protecting layers 4c on the picture pattern layer 2, the picture of the picture pattern layer 2 can be seen through.

This embodiment enriches the gloss of the first front surface protecting layer 3c compared with the gloss of the second front surface protecting layers 4c; therefore, a convex portion can be expressed by the first front surface protecting layer 3c and depressed portions can be expressed by the second front surface protecting layers 4c, and the visual solidity can be felt. Furthermore, the second front surface protecting layer 4c contains the synthetic resin beads or the filler; therefore, the solidity can be felt by the sense of touch.

Furthermore, since this embodiment uses the moisture-proof paper as the sheet base material 1, this ensures causing water vapor to be less likely to pass from the front surface side of the decorative sheet 20C through the back surface side, that is, from the second front surface protecting layer 4c side through the substrate 6 side, thereby ensuring preventing the substrate 6 from deforming due to water vapor (humidity). Therefore, for example, the formation of the large-size sliding door with the decorative panel 10C allows preventing the deformation of the sliding door due to water vapor (humidity), thereby ensuring preventing the failure of the opening and closing of the sliding door due to the deformation.

(Effects of This Embodiment)

The present invention according to the embodiment provides the following effects.

(1) The decorative sheet 20C according to the embodiment includes the picture pattern layer 2 formed on the sheet base material 1, the first front surface protecting layer 3c formed on the picture pattern layer 2, and the second front surface protecting layers 4c partially formed on the first front surface protecting layer 3c. The first front surface protecting layer 3c contains the thermoset resin containing the urethane linkage. The second front surface protecting layer 4c contains the synthetic resin beads or the filler of the inorganic compound. Additionally, the gloss of the first front surface protecting layer 3c is enriched compared with the gloss of the second front surface protecting layer 4c.

Thus, the first front surface protecting layer 3c is made of the resin with the high hardness and the gloss of the first front surface protecting layer 3c is enriched. Furthermore, the first front surface protecting layer 3c is made of the resin by which the second front surface protecting layers 4c can express the visual solidity insusceptible to the gloss of the first front surface protecting layer 3c even when the second front surface protecting layers 4c are formed on the first front surface protecting layer 3c. This ensures improving the damage resistance and the contamination resistance and further ensures providing the visual solidity by the first front surface protecting layer 3c exposed to the front surface. This ensures providing the decorative sheet excellent in the damage resistance and the contamination resistance and having the visual solidity while maintaining the solidity by the sense of touch.

(2) With the decorative sheet 20C according to the embodiment, the second front surface protecting layer 4c contains the silica particles by 5 mass % or more to 35 mass % or less.

This structure comparatively increases the silica particles contained in the second front surface protecting layer 4c, 5 mass % or more; therefore, the gloss of the second front surface protecting layer 4c can be sufficiently reduced, ensuring increasing the gloss difference between the second front surface protecting layer 4c and the first front surface protecting layer 3c. Therefore, for example, even when the area of the second front surface protecting layers 4c is small, the visual solidity can be appropriately felt.

(3) With the decorative sheet 20C according to the embodiment, the synthetic resin beads are the acrylic resin beads.

This structure ensures improving the transparency of the second front surface protecting layer 4c and ensures further clearly seeing the picture of the picture pattern layer 2 to add the design through the second front surface protecting layer 4c.

(4) With the decorative sheet 20C according to the embodiment, the sheet base material 1 includes the two paper base materials 1a and 1b and the moisture-proof resin layer 1c, which is disposed between the two paper base materials 1a and 1b.

This structure allows the sheet base material 1 to have the thickness and the stiffness. Therefore, the decorative sheet 20C is less likely to generate creases and a curl of the decorative sheet 20C can be prevented. Accordingly, the decorative sheet 20C can be comparatively easily laminated to the substrate 6.

(5) With the decorative sheet 20C according to the embodiment, the second front surface protecting layer 4c has the surface with the maximum height Rmax value measured by the contact type roughness meter of 30 μm or more.

With this structure, the solidity by the sense of touch can be further appropriately felt.

(6) With the decorative sheet 20C according to the embodiment, the first front surface protecting layer 3c contains the thermoset resin containing the urethane linkage.

With this structure, the adhesiveness with other layers such as the picture pattern layer 2 and the second front surface protecting layers 4c and the deformation followability and the damage resistance of the decorative sheet 20C can be improved.

(7) With the decorative sheet 20C according to the embodiment, the second front surface protecting layer 4c contains the thermoset resin containing the urethane linkage and the silica particles.

With this structure, the adhesiveness to the adjacent layer such as the first front surface protecting layer 3c and the deformation followability and the damage resistance of the decorative sheet 20C can be improved.

(8) The decorative panel 10C according to the embodiment is formed by pasting the decorative sheet 20C to the substrate 6.

This structure ensures providing the decorative panel 10C excellent in the contamination resistance and the design.

(Modifications)

Figure 8:
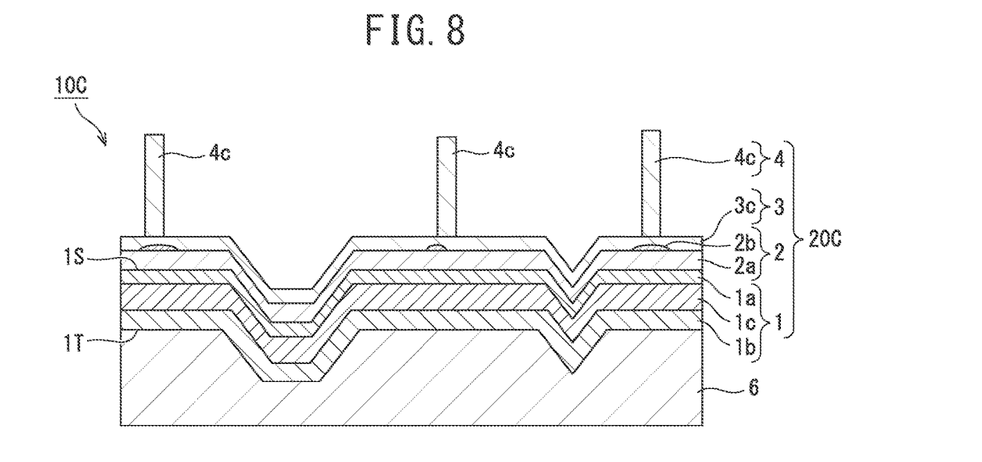
FIG. 8 is a cross-sectional view illustrative of a decorative panel according to a modification of the third embodiment of the present invention.

While the embodiment describes the example where the visual solidity and the solidity by the sense of touch are felt by the gloss difference between the first front surface protecting layer 3c and the second front surface protecting layers 4c and the difference in height between the first front surface protecting layer 3c and the second front surface protecting layers 4c, other structures are also applicable. For example, as illustrated in FIG. 8, the embossing may be formed on the decorative sheet 20C by the embossing process and the embossing may cause the human to further feel the solidity by the sense of touch. In this case, the embossing process may cause a depressed portion with a depth of 15 μm or more to pass through between an embossing roll and a rubber back roll with hardness of 50 degrees or more to less than 90 degrees to form the concavo-convex shape on the decorative sheet 20C. As a measurement method for the hardness, for example, JIS K 6301 A is applicable. The substrate 6 is pasted to the embossed decorative sheet 20C to form the decorative panel 10C.

(Reference Example)

The following briefly describes the decorative sheet and the decorative panel that do not include the above-described technological features as the reference example of the decorative sheet and the decorative panel according to this embodiment.

Conventionally, there has been provided the technology as the decorative sheet described in, for example, the above-described PTL 1. The technology described in PTL 1 includes the picture pattern layer, which is formed on the sheet base material, the first front surface protecting layer, which is formed on the picture pattern layer, and the second front surface protecting layers, which are formed on the first front surface protecting layer. The second front surface protecting layer contains synthetic resin beads projecting from the second front surface protecting layers. This provides unevenness on the surface of the decorative sheet such that the solidity is felt by the sense of touch.

Such decorative sheet generally enriches the gloss of the outermost layer (the gloss of the second front surface protecting layer) compared with the gloss of the layer inside with respect to the outermost layer (the gloss of the first front surface protecting layer).

However, the decorative sheet manufactured by the technology described in PTL 1 has the comparatively low hardness on the surface of the decorative sheet; therefore, there is a possibility that the damage resistance becomes low and the contamination resistance becomes low.

REFERENCE SIGNS LIST 1 sheet base material,
1a paper base material,
1b paper base material,
1c moisture-proof resin layer,
1d paper base material,
2 picture pattern layer,
2a pattern ink layer,
2b pipe ink layer,
3 first front surface protecting layer,
3a, 3b, 3c first front surface protecting layer,
4 second front surface protecting layer,
4a, 4b, 4c second front surface protecting layer,
5 third front surface protecting layer,
6 substrate,
10A, 10B, 10C decorative panel,
20A, 20B, 20C decorative sheet

The invention claimed is:

1. A decorative sheet comprising:
a picture pattern layer formed on a sheet base material;
a first front surface protecting layer formed on the picture pattern layer;
a second front surface protecting layer partially formed on the first front surface protecting layer; and
a third front surface protecting layer partially formed on the second front surface protecting layer,
wherein the first front surface protecting layer and the second front surface protecting layer have different glosses, and
the third front surface protecting layer coats an area 75% or less of the second front surface protecting layer, the third front surface protecting layer having a thickness four times or more of a thickness of the second front surface protecting layer.

2. The decorative sheet according to claim 1,
wherein the third front surface protecting layer has a surface with a maximum height Rmax value measured by a contact type roughness meter of 30 μm or more.

3. The decorative sheet according to claim 1,
wherein the second front surface protecting layer contains a thermoset resin containing an urethane linkage.

4. The decorative sheet according to claim 1,
wherein the third front surface protecting layer contains a thermoset resin containing an urethane linkage.

5. The decorative sheet according to claim 1,
wherein the third front surface protecting layer contains an ionizing radiation cured resin.

6. The decorative sheet according to claim 1,
wherein the third front surface protecting layer contains a synthetic resin bead with an average grain diameter of 30 μm or more or a filler of an inorganic compound.

7. The decorative sheet according to claim 1,
wherein the sheet base material has a moisture-proof property.

8. A decorative sheet comprising:
a picture pattern layer formed on a sheet base material;
a first front surface protecting layer formed on the picture pattern layer; and
a second front surface protecting layer partially formed on the first front surface protecting layer, wherein the first front surface protecting layer contains a thermoset resin containing an urethane linkage, the second front surface protecting layer contains a thermoset resin containing an urethane linkage or an ionizing radiation cured resin, the second front surface protecting layer coating an area 0.1% or more to 30% or less of the first front surface protecting layer, and the first front surface protecting layer has a gloss enriched compared with a gloss of the second front surface protecting layer.

9. The decorative sheet according to claim 8, wherein the gloss of the second front surface protecting layer has a gradation.

10. A decorative sheet comprising:

a picture pattern layer formed on a sheet base material;

a first front surface protecting layer formed on the picture pattern layer; and a second front surface protecting layer partially formed on the first front surface protecting layer, wherein the first front surface protecting layer contains a thermoset resin containing an urethane linkage, the second front surface protecting layer contains a synthetic resin bead or a filler of an inorganic compound, and the first front surface protecting layer has a gloss enriched compared with a gloss of the second front surface protecting layer.

11. The decorative sheet according to claim 10, wherein the second front surface protecting layer contains silica particles by 5 mass % or more to 35 mass % or less.

12. The decorative sheet according to claim, 6, wherein the synthetic resin bead is an acrylic resin bead.

13. The decorative sheet according to claim 10, wherein the second front surface protecting layer has a surface with a maximum height Rmax value measured by a contact type roughness meter of 30 μm or more.

14. The decorative sheet according to claim 10, wherein the second front surface protecting layer contains a thermoset resin containing an urethane linkage and silica particles.

15. The decorative sheet according to claim 1, wherein the sheet base material includes two paper base materials and a moisture-proof resin layer disposed between the two paper base materials.

16. The decorative sheet according to claim 1, wherein the first front surface protecting layer contains the thermoset resin containing an urethane linkage and silica particles.

17. The decorative sheet according to claim 1, wherein a concavo-convex shape is formed by an embossing process.

18. A decorative panel comprising the decorative sheet according to claim 1, the decorative sheet being pasted to a substrate to form the decorative panel.

19. The decorative sheet according to claim 2, wherein the second front surface protecting layer contains a thermoset resin containing an urethane linkage.

20. The decorative sheet according to claim 2, wherein the third front surface protecting layer contains a thermoset resin containing an urethane linkage.

* * * * *